T. D. LYNCH.
TESTING DEVICE.
APPLICATION FILED DEC. 26, 1913.

1,414,427. Patented May 2, 1922.

WITNESSES:
Fred. A. Lind.
JHProcter

INVENTOR
Tillman D. Lynch
BY
Wesley L. Carr
ATTORNEY

UNITED STATES PATENT OFFICE.

TILLMAN D. LYNCH, OF PITTSBURGH, PENNSYLVANIA, ASSIGNOR TO WESTINGHOUSE ELECTRIC AND MANUFACTURING COMPANY, A CORPORATION OF PENNSYLVANIA.

TESTING DEVICE.

1,414,427.  Specification of Letters Patent.  Patented May 2, 1922.

Application filed December 26, 1913. Serial No. 808,712.

*To all whom it may concern:*

Be it known that I, TILLMAN D. LYNCH, a citizen of the United States, and a resident of Pittsburgh, in the county of Allegheny and State of Pennsylvania, have invented a new and useful Improvement in Testing Devices, of which the following is a specification.

My invention relates to testing devices and particularly to devices for testing the relative brittleness and toughness of metals.

My invention has for its principal object to provide hammer devices for testing the relative toughness and brittleness of alloys which are used for bearings and other similar purposes.

Heretofore the toughness of a metal has been tested by placing a ball about 10 millimeters in diameter on the specimen to be tested and then placing a heavy weight on the 10 millimeter ball for a definite period of time. The impression of the ball was considered a measure of the relative hardness of the metal being tested, but it did not constitute a measure of the degree of brittleness of the metal a knowledge of which was essential if the metal was to be used for bearings, and especially if the temperature at which the metal was poured or to which it was heated affected its brittleness. Therefore, in order to test a sample of metal for its relative brittleness, I provide the hammer device hereinafter described and claimed.

Figure 2:
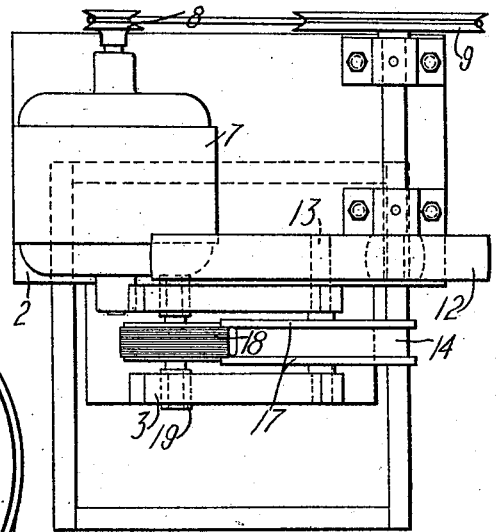
Figure 1:
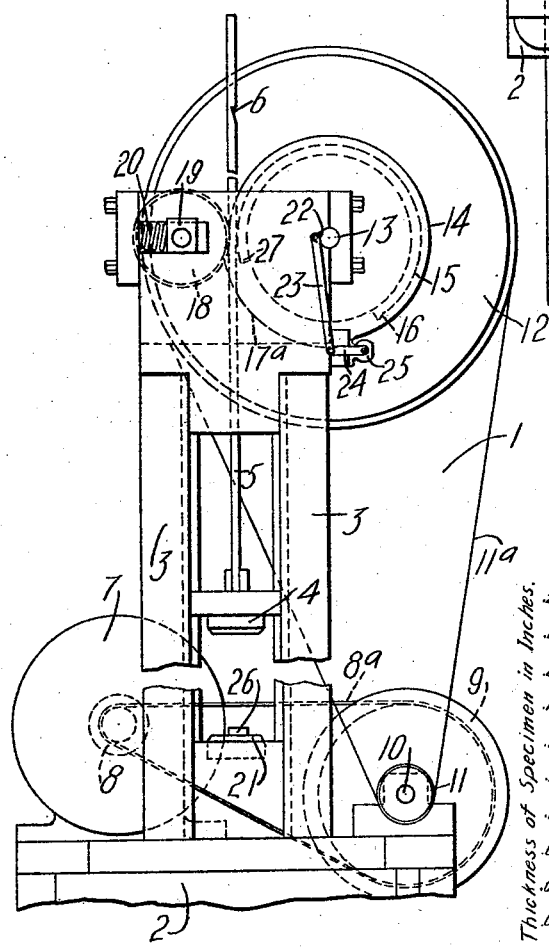
Figure 3:
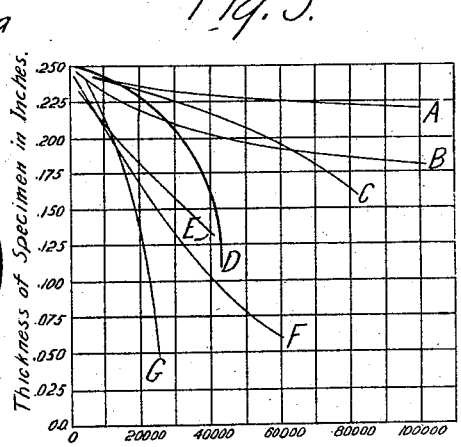

In the accompanying drawing, Fig. 1 is a side elevational view of a hammer device embodying my invention, Fig. 2 is a plan view of the device shown in Fig. 1 and Fig. 3 is a record of tests performed with a device embodying my invention.

Referring to the drawings, my invention embodies an automatically operating hammer device 1 comprising a base structure 2 upon which is mounted a plurality of standards 3 for guiding a hammer 4 that is attached to a flat bar 5 having a notch 6 in one side thereof. A motor 7 is mounted on the base 2 and drives a grooved pulley 9 on a shaft 10 by means of a grooved pulley 8 and a suitable belt 8$^a$. A second pulley 11 on the shaft 10 is operatively connected to a pulley 12 on a shaft 13 by a belt 11$^a$. The shaft 13 has mounted thereon a wheel 14 having a covering 15 of leather over a portion of its circumference. The leather covering 15 is arranged to have a projection 16 at one of its ends for engaging the notch 6 in the bar 5 to insure positive operation. The wheel 14 has flanges 17 for guiding the bar 5. The flanges 17 are enlarged over a portion of their circumference to form cams 17$^a$ for reasons hereinafter explained. The bar 5 is maintained in contact with the leather covering 15 of the wheel 14 by a friction idler wheel 18 having movable bearings 19 which are acted upon by springs 20. An anvil 21 is disposed between the standards 3 directly beneath the hammer 4.

In order to register the number of strokes the hammer makes, I provide a crank 22 on the end of the shaft 13 which transmits its motion through a connecting rod 23 to a lever arm 24 that is operatively connected to a counting device 25 of any well known design.

A sample 26 of the metal to be tested for brittleness is prepared by pouring the metal into a mould of a definite size. When cooled, the sample 26 is placed upon the anvil 21 and tested in the following manner:

The motor 7 is energized to drive the pulley 12 on the shaft 13 through the pulleys 8, 9 and 11 and the belts 8$^a$ and 11$^a$ that co-operate therewith. As the shaft 13 rotates, the projection 16 engages the notch in the bar 5 and starts an upward movement of the bar, friction between the wheel 18 and the leather covering 15 being sufficient to continue the upward movement.

When the point 27 of the leather covering 15 reaches the position shown in Fig. 1, the cams 17$^a$ engage the rims of friction wheel 18 and compress the springs 20, thus releasing the bar 5 and allowing the hammer 4 to drop freely upon the test sample 26. As the wheel 14 continues to rotate, the notch 6 is again engaged by the projection 16 and the operation hereinbefore described is repeated. As a considerable number of hammer strokes is necessary to test some pieces, the mechanism is preferably designed to ensure a rapid recurrence of such strokes. The thickness of the sample 26 is measured before testing, and, after a definite number of strokes, depending upon the metal being tested, the thickness of the sample is again measured and the operation is continued. A curve is plotted with the thicknesses of the sample as ordinates and the number of strokes it has received as abscissas. Thus, the relative hardness, together with toughness or brittleness, is apparent from the curve as shown in Fig. 3.

In Fig. 3, curve A represents the toughness of a hard, tough metal since, after 100,000 strokes of the hammer, it has decreased but slightly more than 25/1000 of an inch in thickness, while the brittle metal represented by curve (G) has decreased 2/10 of an inch after only 25000 strokes, when it actually went to pieces, thus giving a relative measure of its brittleness and toughness as compared with the metal represented by curve A. The curves, B, C, D, E, and F represent the relative brittleness and toughness of a lead base alloy for bearings which has been heated to different temperatures and poured under different conditions. The relative conditions of the samples, in respect to disintegration after a definite number of strokes, is an indication of their relative brittleness.

While I have described the preferred form of my invention, changes may be made in its form of construction which do not depart from the spirit and scope of the same as set forth in the appended claims.

I claim as my invention:

1. A testing device including an anvil, an impact member movable into and out of engagement with the anvil, a bar operatively connected to the impact member, friction rollers engaging against opposite sides of the bar, means for rotating one of the rollers, resilient means holding the other roller in yielding engagement with the bar and means for intermittently moving such roller out of engagement with the bar.

2. A sample testing device including an anvil, an impact member co-operating therewith, a bar operatively connected to such member, a driven friction roller engaging one side of the bar and provided with peripheral flanges engaging the side edges of the bar to guide it, a second friction roller yieldably held in engagement with the opposite side of the bar, and means governed by the turning of the first friction roller for intermittently moving the second friction roller out of engagement with the bar.

3. A sample testing device including an anvil, a co-operating impact member, a bar having connection with such member, a driven friction roller having spaced peripheral flanges engaging the edges of the bar, a second friction roller yieldably held in engagement with the bar at a point opposite the point of engagement of the bar with the first roller, and cam means carried by the first roller for intermittently moving the second roller out of engagement with the bar.

4. A sample testing device including a pair of friction rollers, one of the friction rollers having spaced peripheral flanges engaging the periphery of the other roller and provided with cam portions, the other roller being yieldably held in engagement with the first, a rod mounted between the rollers and between the flanges of the first roller to be raised through turning of the rollers and released through engagement of the cam portions of the flanges of the first roller with the periphery of the second roller, an impact member carried by the bar and an anvil disposed in the path of movement of the impact member.

5. A sample testing device including opposed friction rollers, a bar disposed between the rollers, means yieldably holding the rollers in engagement with opposite sides of the bar, means for intermittently moving the rollers away from each other, pawl and notch co-operating means between one of the rollers and the bar for positively engaging the bar after it has been released by separation of the rollers, an impact member carried by the bar and an anvil operatively disposed relative to the impact member.

In testimony whereof, I have hereunto subscribed my name this 18th day of Dec., 1913.

TILLMAN D. LYNCH.

Witnesses:
O. W. A. OETTING,
B. B. HINES.